United States Patent

[11] 3,616,095

| [72] | Inventor | Hercules Membrino |
| | | 1934 Arch St., Philadelphia, Pa. 19103 |
| [21] | Appl. No. | 874,523 |
| [22] | Filed | Nov. 6, 1969 |
| [45] | Patented | Oct. 26, 1971 |

[54] APPARATUS FOR FORMING A STRIP OF SEVERABLE BAGS FROM THERMOPLASTIC MATERIAL
9 Claims, 14 Drawing Figs.

[52] U.S. Cl. ............................................. 156/582,
156/515, 93/8
[51] Int. Cl. ......................................... B32b 31/18,
B31b 1/14
[50] Field of Search........................................ 156/582,
583, 515, 253; 93/8

[56] References Cited
UNITED STATES PATENTS
| 2,229,121 | 1/1941 | Nye et al.................... | 156/515 X |
| 3,033,257 | 5/1962 | Weber........................ | 156/515 X |
| 3,086,577 | 4/1963 | Gimple....................... | 156/582 X |

Primary Examiner—Benjamin A. Borchelt
Assistant Examiner—J. J. Devitt
Attorney—Arthur A. Jacobs ABSTRACT: A bagmaking machine comprising a support structure upon which is mounted a rotatable heat sealing and cutting means in tangency with a rotatable impression roller, the heat sealing and cutting means being adapted to form lines of seal and severance with spaced interruptions in a double-ply thermoplastic strip as the strip moves between the heat sealing and cutting means and the impression roller from a supply roller or the like. The interruptions or "nips" form connecting means between the bags formed from the strip by the heat sealing and cutting means. These interruptions or "nips" comprise sealed portions but not severance. This type of sealing is obtained by indenting the thermoplastic material of the strip just sufficiently away from the heating means so that the heat will cause melting and sealing of the thermoplastic material, but such melting will not penetrate through the outermost layer, a sufficient distance to cause severance. The heat sealing and cutting means comprise a rotatable head having a plurality of heating wires or the like which are spaced from each other around the periphery of the head. These heating wires may be selectively made inoperative so that the distances between the operative heating wires may be varied. Means are also provided to vary the relative rotatable speeds of the heat sealing and cutting means and the impression roller so that the size of the resulting bags may also be varied in such manner.

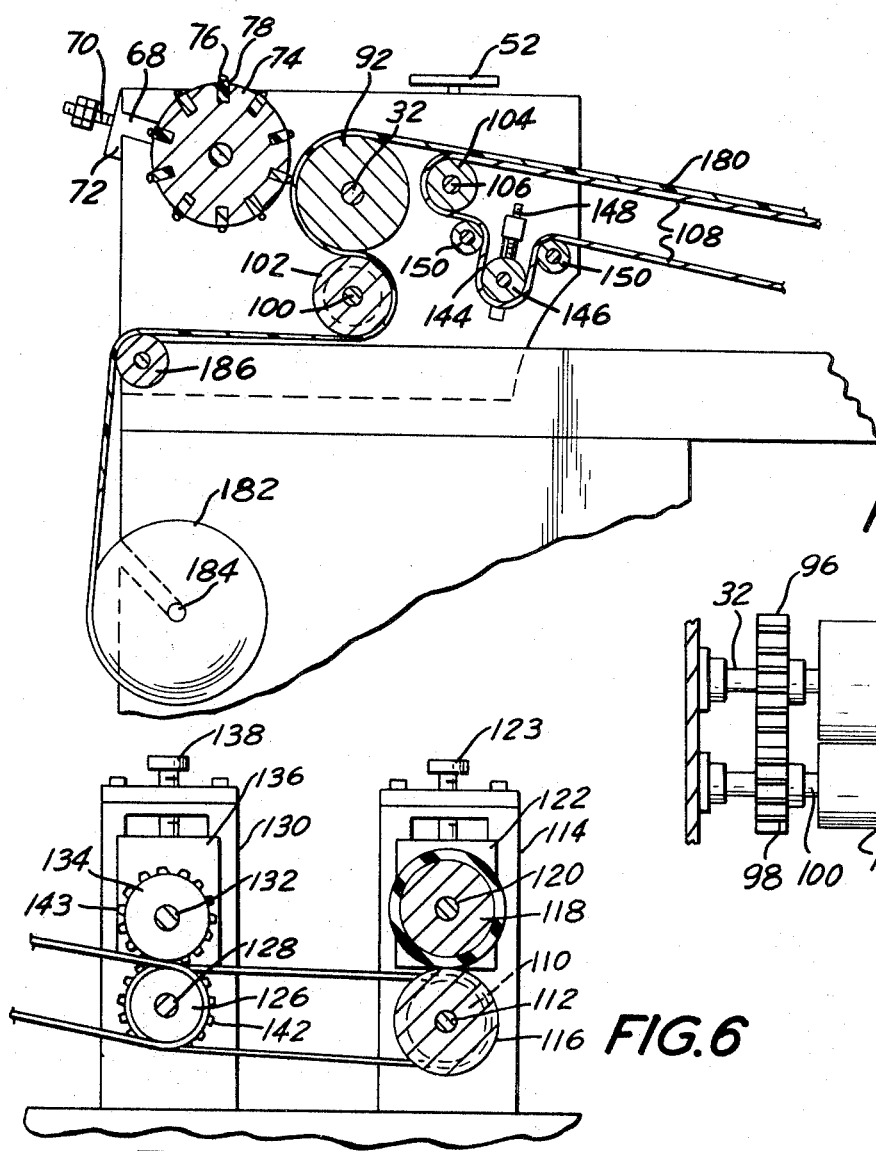
FIG. 4
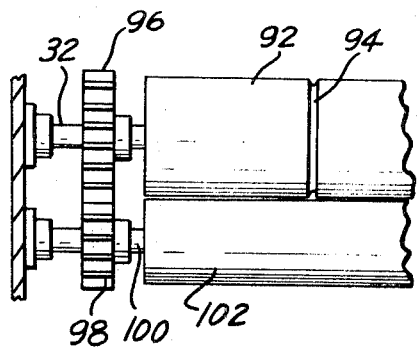
FIG. 5
FIG. 6
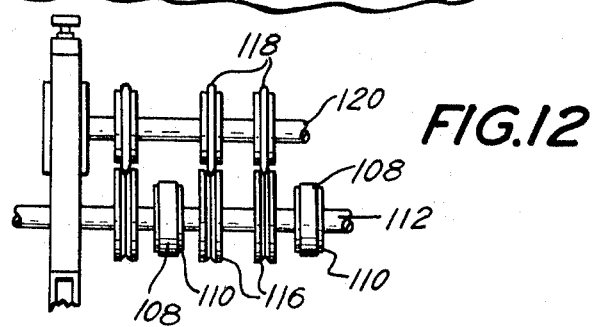
FIG. 12
INVENTOR
HERCULES MEMBRINO
BY
Arthur A. Jacobs
ATTORNEY

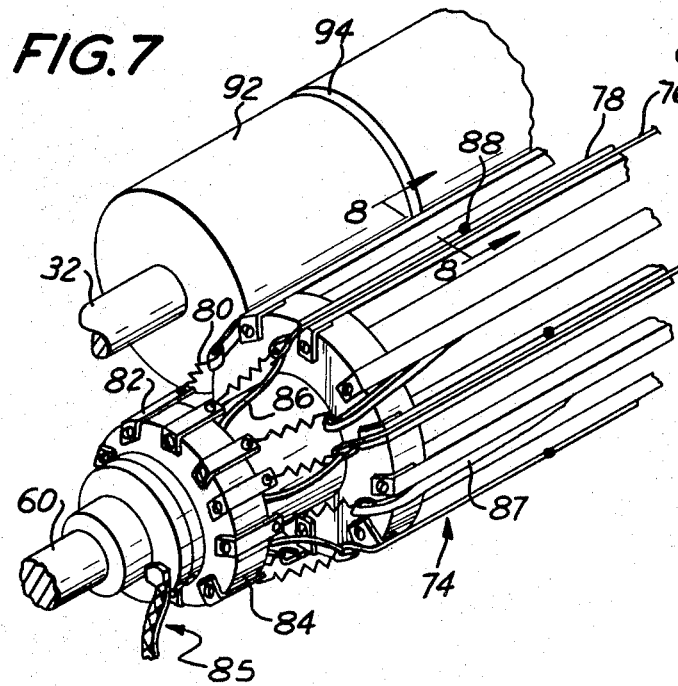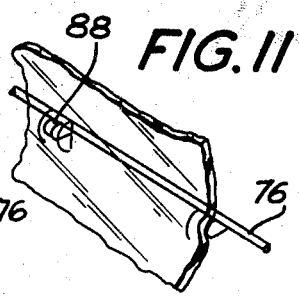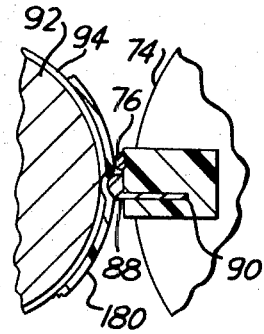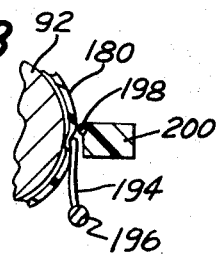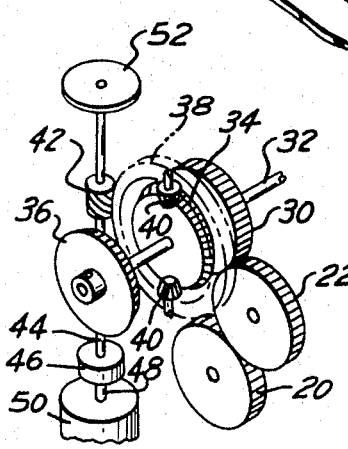

APPARATUS FOR FORMING A STRIP OF SEVERABLE BAGS FROM THERMOPLASTIC MATERIAL

This invention relates to a machine for making bags, and it particularly relates to a machine for making bags of thermoplastic polyolefin materials such as polyethylene, polypropylene, polyvinyl alcohol, polyvinyl acetate, and the like.

In order to produce bags of the aforesaid type in the most economical and rapid manner, a machine, such as disclosed in U.S. Pat. No. 3,233,527, was heretofore used. This machine proved very effective but was subject to certain disadvantages. For one thing, the bags produced thereby always had one or more perforations in the side. These perforations were caused by the "nips" or unsealed portions used to connect the bags in a continuous strip while they passed through the machine. When the bags were completed, these "nips" had to be severed to separate the individual bags. When such severance took place, small, unsealed holes remained in the finished bags.

Another disadvantage of the aforesaid machine was the necessity of using strands of tape or the like to prevent heat sealing and severance at the "nips." These tapes became worn, frayed and torn after relatively small periods of use and constantly had to be replaced. They were also somewhat unsightly and spoiled the finished appearance of the machine.

A third disadvantage of this machine was its positioning of the roll of raw stock in such a manner that the machine could not be used in tandem with another machine, such as a printing press, extruder or the like, for continuous production. Instead, the strip of bags had to first be put through one operation, such as printing, and then removed bodily and sent through another operation such as sealing and separating.

A further disadvantage of the aforesaid machine was the fact that it could not be used to make various different sizes of bags without completely disassembling and reassembling the cutting and sealing head. This not only limited production of the various sizes but prevented the easy manufacture of bags with gussets such as are often desirable in such products, since these gussets require additional bag material over and above the actual size of the bag itself.

It is, therefore, one object of the present invention to provide a bag making machine which utilizes a continuous process for making bags in strips, whereby, when the bags are separated, they are free of holes or perforations.

Another object of the present invention is to eliminate the use of masking threads or the like to form the connecting "nips" between the bags in a strip.

Another object of the present invention is to so position the raw stock that it can be continuously fed between the bag making machine and other mechanisms for other types of processing.

Another object of the present invention is to provide means for varying the sizes of the bags being produced by simple adjustment and without the necessity of disassembly.

Other objects and many of the attendant advantages of this invention will be readily appreciated as the same becomes better understood by reference to the following description when read in conjunction with the accompanying drawings wherein:

FIG. 4 is a sectional view taken on line 4—4 of FIG. 3.

FIG. 5 is a sectional view taken on line 5—5 of FIG. 3.

FIG. 6 is a sectional view taken on line 6—6 of FIG. 3.

FIG. 7 is an enlarged, fragmentary, perspective view of the cutting and sealing head and the impression roller.

FIG. 8 is an enlarged, detailed, sectional view taken on line 8—8 of FIG. 7.

FIG. 9 is an enlarged, fragmentary, perspective view of the strip after being heat sealed but before the bags are separated.

FIG. 10 is an exploded perspective view of the differential gear mechanism for varying the speed of the impression roller.

FIG. 11 is a top plan view showing the position of a heating wire relative to the groove in the strip.

FIG. 12 is a fragmentary view of the severing means.

FIG. 13 is an enlarged, detailed sectional view of an alternative type of nip-forming means.

FIG. 14 is a view similar to FIG. 13 of a third type of nip-forming means.

Figure 1:
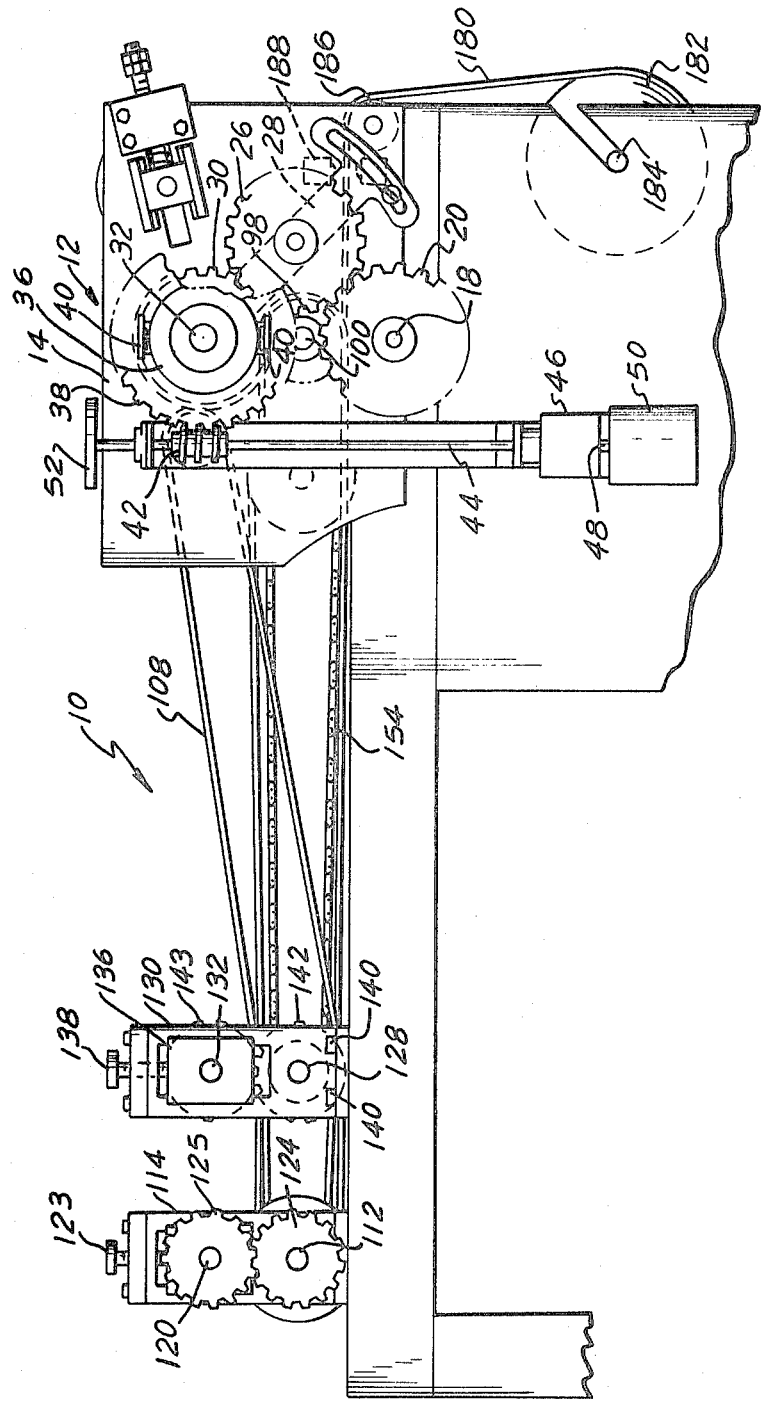
FIG. 1 is a side elevational view of a machine embodying the present invention.

Referring now in greater detail to the various figures of the drawings wherein similar reference characters refer to similar parts, there is shown a machine, generally designated 10, comprising a framework 12 which includes a first sideplate 14 and an opposite side plate 16.

Between the side plates 14 and 16 extends a main drive shaft 18 having a gear 20 at one end. The shaft 18 is driven by any desirable means, such as, for example, by a motor 21 which is provided with a pulley 22 connected to a pulley 23 on the shaft 18 by an endless belt 24.

The gear 20 is a so-called "change gear"; that is, it may be replaced by any size gear as required in order to vary the rotational speed of the impression roller to be hereinafter described. The gear 20 is in mesh with an idler gear 26 which is mounted on an adjustable rocker arm 28 in order that the gear 26 may be adjusted in accordance with the size of the change gear so that it is always in mesh therewith.

The idler gear 26 is in mesh with a gear 30 mounted on a shaft 32. Secured to the gear 30 is a beveled gear 34 (best shown in FIG. 10). A beveled gear 36 is secured to the shaft 32. Between the gear 34 and the gear 36 is a ring gear 38 and connected to this ring gear 38 are two oppositely disposed beveled pinions 40. More than two such pinions may be used if desired. The pinions 40 are each in mesh with both the gear 34 and the gear 36.

In mesh with the ring gear 38 is a worm 42 mounted on a shaft 44 which is connected to a magnetic clutch 46. The clutch 46 is connected through shaft 48 to a continually running variable speed electric motor 50. An upper extension of the shaft 44 is provided with a hand wheel 52 to alternatively rotate the worm 42 when the motor 50 is not running.

Figure 2:
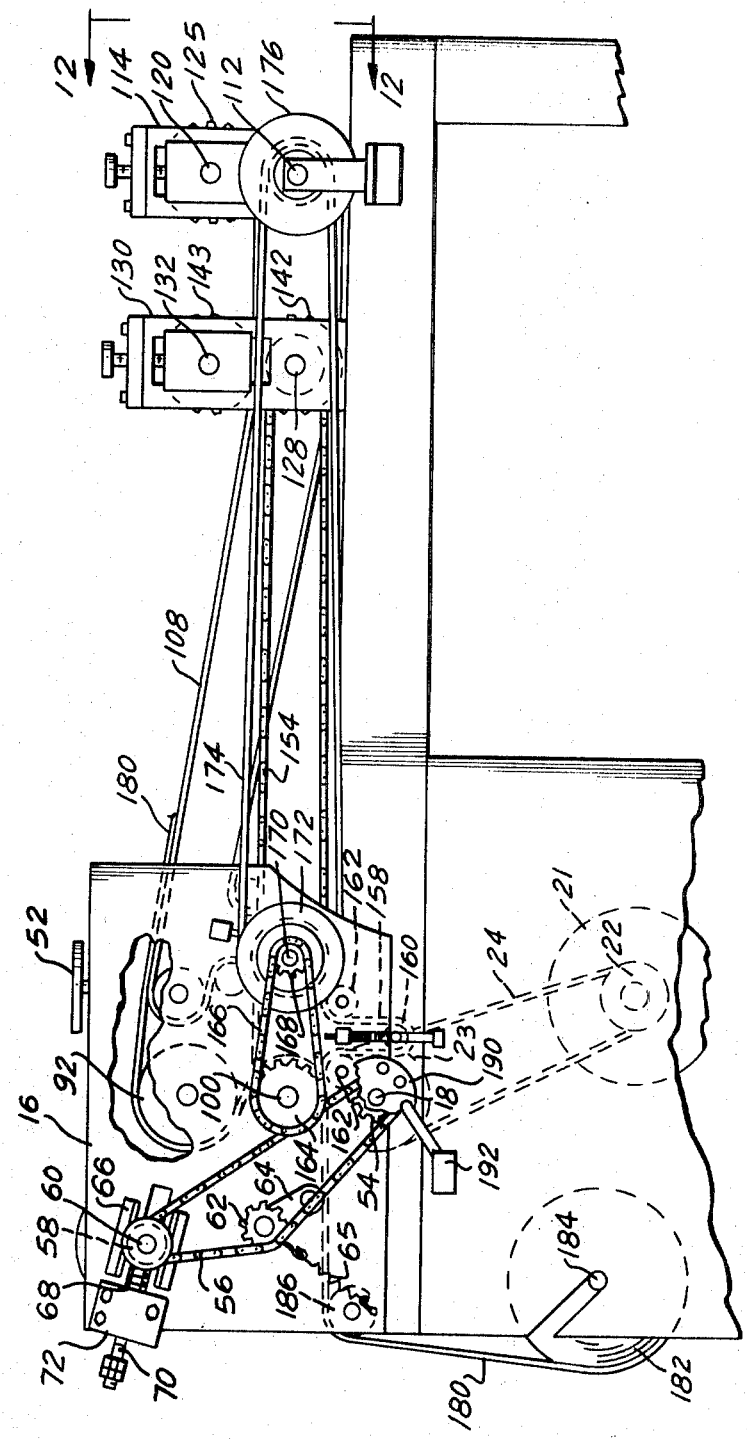
FIG. 2 is a side elevational view taken from the opposite side of FIG. 1.
Figure 3:
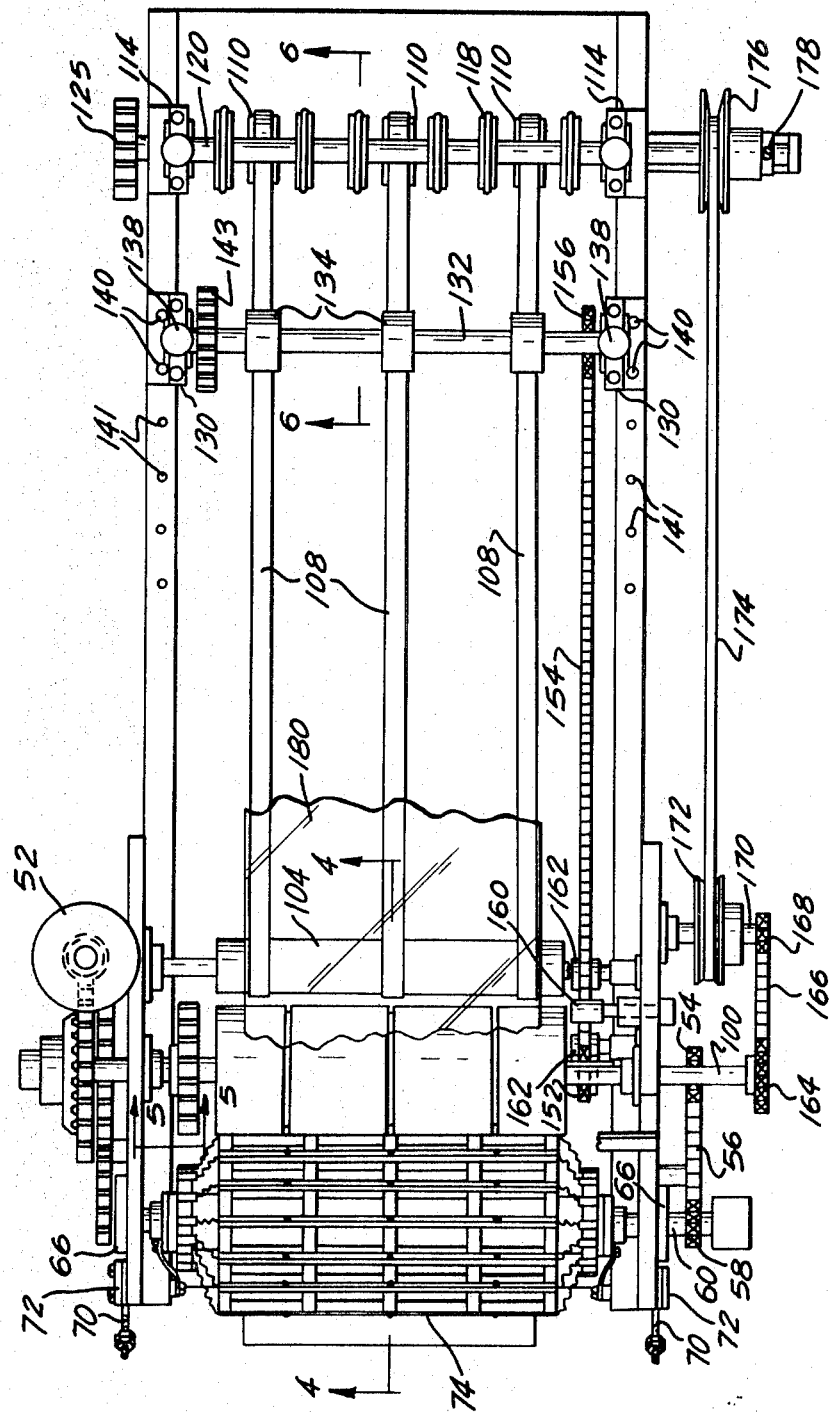
FIG. 3 is a top plan view of the machine of FIG. 1 with the strip of raw stock shown fragmentarily.

Also mounted on the shaft 18 is a sprocket 54 (see FIGS. 2 and 3) which is connected by an endless chain 56 to a sprocket 58 mounted on a shaft 60. An idler sprocket 62 mounted on a rocker arm 64, and biased by a spring 65, keeps the chain 56 taut. The shaft 60 is supported by two adjustable bearing blocks 66, one on each side plate. The bearing blocks are slidable in corresponding slots 68 in the respective side plates, and are also provided with adjusting screws 70 extending through tapped holes in the corresponding blocks 72 on the side plates. This permits adjustment of the shaft 60 which supports the heat sealing head 74 (best shown in FIGS. 3, 4 and 7). This adjustment is required in order to permit substitution of sealing heads of different diameters. It thereby sets the pressure required to provide the heat sealing.

The sealing head 74 comprises a roller provided with a plurality of equidistantly spaced heating wires 76, each mounted on an insulating block 78 on the periphery of the sealing head roller. The heating wires 76 may be of any standard type of electrical resistance material, such as "Nichrome" (an alloy containing 60% nickel, 24% iron, 16% chromium and 0.1% carbon, manufactured by the Driver-Harris Co., Harrison, N.J.). If desired, a knife blade or the like, made of electrical resistance material, may be substituted for the wires. The ends of each wire 76 are connected by springs 80 to electrically conductive fingers 82 on a rotary commutator 84, and are also connected to the commutator by wires 86, which conduct the electrical current to the heating wires. The commutator 84 is connected to a source of energy (not shown) by a wire 85. There are two commutators, one at each end of the sealing head, and the current is applied in series. A shunt wire 87 may be provided at each station to carry the current when the corresponding heating wire is not being used.

Adjacent each wire 76 on the respective block 78 is at least one small knob 88, three such knobs, equidistantly spaced, being shown here for each block. These knobs 88 may be provided in any manner desired and may be integral with, removable from, or adjustable on the block 78. In the form shown herein, the knob is a head formed on a pin 90 (see FIG. 8) frictionally engaged within a corresponding slot in the block 78.

Tangential to the rotary sealing head 74 is an impression roller 92 mounted on the shaft 32. The roller 92 is provided with one or more peripheral grooves 94 corresponding in position and number to the knobs 88 on the sealing head 74.

Also mounted on the shaft 32 is a gear 96 which is in mesh with a gear 98 (see FIG. 5) mounted on a shaft 100. The shaft 100 supports a pinch roll 102 that coacts with the impression roller 92 to pass the strip around the impression roller which is tangential thereto.

Adjacent the impression roller 92 is a roller 104 mounted on a shaft 106. This roller 104 supports a series of parallel endless conveyor belts 108 which are supported at the opposite end of the framework by a series of rollers 110 mounted on a shaft 112 (see FIG. 6). The shaft 112 is mounted between a pair of standards 114 fixed to the framework. Also mounted on the shaft 112 are a series of grooved rollers 116. These grooved rollers 116 mate with ribbed rubber rollers 118 on a parallel shaft 120. The shaft 120 is mounted between bearing blocks 122 vertically adjustable on the standard 114 by a screw 123. A gear 124 on shaft 112 meshes with a gear 125 on shaft 120 to drive both shafts in synchronism (Note FIG. 1).

Between the rollers 110 and the roller 104 are a series of coaxial rollers 126 mounted on a common shaft 128 positioned between a pair of standards 130. Parallel with the shaft 128 is a shaft 132 upon which is mounted a series of pinch rollers 134 corresponding in position to rollers 126. The shaft 132 is mounted between blocks 136 vertically adjustable by a screw 138. The standards 130 are horizontally adjustable by means of screws 140 removably positioned in a series of tapped holes 141 in the framework (see FIG. 3). A gear 142 on shaft 128 meshes with a gear 143 on shaft 132 to drive both shafts in synchronism.

A loop 144 is formed in each belt 108 by an idler roller 146 (see FIG. 4) which is adjustable by a screw 148. Idler rollers 150 are provided at each side of the roller 146. This loop permits the slack to be taken up in the belts during adjustment of the standards 130.

Mounted on the shaft 100 is a sprocket 152 (see FIG. 2 and 3) which is connected by an endless chain 154 to a sprocket 156 on the shaft 128. A loop 158 is formed in the chain 154 by a sprocket 160 and idler sprockets 162 (see FIGS. 2 and 3) in order to take up the slack in the chain during adjustment of the standards 130. The chain 154 drives the rollers 126 in synchronism with the pinch roller 102.

Also mounted on the shaft 100 is a sprocket 164 connected by an endless chain 166 to a sprocket 168 on a shaft 170. The shaft 170 supports a variable speed pulley 172 which is connected by a belt 174 to a variable speed pulley 176 on the shaft 112. The pulley 176 is provided with an adjusting screw 178 which is adapted to spread the pulley 176 to vary the speed of shaft 112. By adjusting the variable speed pulley 176 so that the grooved rollers 116 and the corresponding ribbed rollers 118 (see FIG. 12) rotate faster than the rollers 126 and 134, the bags formed in the strip are broken at the nips.

The strip 180 for making the bags is, for example, a folded-over sheet of polyethylene or the like. It may also be a tube; either type being considered a "double-ply" strip. It is provided on a supply roll 182 (see FIG. 2) mounted on a spindle 184. The strip is pulled from the roll 182 by roller 186 and pinch roller 102. It passes over the impression roll 92 and between that and the sealing head 74. It then passes onto the conveyor belts 108.

In many cases, the strip is imprinted with advertising matter or other indicia which is so placed that the design is repeated for each area which is to correspond to an individual bag. The plastic material of the strip is stretchable and, as a result, the indicia may move out of register with the sealing elements so that the lines of seal will cut through the design. In order to compensate for such variations, there is provided a photoelectric eye assembly 188 (see FIG. 1) which is electrically connected to the magnetic clutch 46 through a switch (not shown). One of the plates of the clutch 46 is connected to the continually running motor 50 while the other is connected to the shaft 44.

A cam 190 is mounted on shaft 18 and operates a switch 192 in electrical circuit with the photoelectric eye. This switch 192 must be closed before the photoelectric eye can operate. When the switch 192 is closed, if the photoelectric eye detects an area where indicia is present on the strip, it closes its switch, thereby closing the whole circuit. The magnetic clutch 46 is thereupon activated to connect the motor 50 to the worm shaft 44. The worm 42 actuates the ring gear 38 which, in turn, moves the beveled pinions 40 in the same direction as the rotation of the shaft 32. This causes the gear 36 to rotate in the opposite direction, thereby slowing down both the impression roller 92 and the pinch roller 102 which feed the bag material from the supply roll 182.

This machine, by placing the supply roll 182 at one end, is easily adapted to be placed in tandem with other mechanisms for other operations. For example, the supply roll 82 may be in tandem with a printing press so that as the strip is imprinted, it moves continuously from the printing press to the supply roll 182. Alternatively, the supply roll itself may be eliminated and the strip fed directly from the printing press to the pinch roller 102. In the same manner, an extruder may be placed in tandem either directly to the supply roll 182 or to the pinch roller 102, or such extruder may be in tandem with the printing press which is, in turn, in tandem with the supply roll or pinch roller. This type of continuous operation could not be effected with prior type machines such as U.S. Pat. No. 3,393,493.

The rollers 126 and 134 hold the strip in tension and, for this purpose, are always driven at the same speed as the pinch roller 102 and impression roller 92. On the other hand, the rollers 116 and 118 have a variable speed determined by the variable speed pulley system, as described above, in order to break the bags apart at the strips. The roller assembly on standard 114 may be made inoperative by actuating the screw 123. This would be desirable when other operations are to be effected while the bags are still held together. The screw 138 is used to vary the pressure of the pinch rollers on standard 130.

The construction of the sealing head 74 is important because by having a plurality of equidistantly spaced heating and sealing means (constituted by wires 76 on bars 78) around the periphery of the head, a variety of different sized bags may be made without changing the sealing head itself. This may be accomplished by varying the speed of rotation of the impression roller by means of substituting one change gear for another, and also by energizing any one or more of the heating wires 76 while keeping others deenergized. Different sizes of bags may also be made during the same continuous operation by energizing selected heating wires, which may be variously spaced from each other. It is also possible to make different size bags by changing the sealing head to one of a different diameters.

As indicated above, one of the most important features of the present device is the ability to maintain the individual bags in a strip, after sealing, and then severing the bags while preventing the formation of unsealed holes as a result of the severance. This was not possible heretofore because the connecting means were unsealed nips formed by complete blockage of the sealing wires at specific points. This type of nip was previously utilized, as in the aforesaid U.S. Pat. No. 3,233,527. However, these prior nips were completely unsealed and, therefore, when broken, holes remained. This is avoided in the present invention where, instead of blocking the sealing wires, knobs 88 are positioned in front of each sealing wire 76. These knobs 88 coact with the grooves 94 on the impression roller 92. As the impression roller and sealing head rotate, with the strip therebetween, each knob 88 presses into the material before the corresponding heating wire 76 reaches the material. As the knob 88 presses into the material, it pushes it into the groove 94 so that, as rotation continues, a shallow groove is formed in the material, such groove being transverse to the heating wire (as indicated in FIG. 11). This groove is just deep enough so that when the heating wire passes over it, it will penetrate only a sufficient distance into the material to provide enough heat to cause melting and sealing of the thermoplastic material, but will not penetrate all the way through. Therefore, no severance takes place. In this manner, nips are formed which hold the otherwise severed bag sections together until broken. However, when broken, there is still a line of seal at each side of the break.

Alternative to the nip-forming means shown in FIG. 8, other nip-forming means may be used. One such alternative means is illustrated in FIG. 13 where instead of a knob, such as 88, there is provided a spring-finger 194 mounted on a rod 196 fixed to the machine. This spring-finger (of which as many are provided as there are grooves 94 in the impression roller 92) continuously pushes the strip 180 into the groove 94 so that when the heating wire 198 on block 200 presses against the strip, it does so transverse to the indentation formed by the finger 194.

FIG. 14 illustrates the use of a shaft 202 having one or more rings 204 (corresponding in number and position to the grooves 94 on the impression roller). This shaft 202 is mounted to rotate in synchronism with the impression roller and in tangency thereto. The rings 204 form indentations in the strip similar to those formed by knobs 88 and fingers 194.

The invention claimed is:

1. A bagmaking machine comprising a supporting framework, a rotatable heat sealing and cutting head on said framework, a rotatable impression roller supported on said framework in peripheral tangency to said head, drive means operatively connected to said head and said impression roller, means for moving a double-ply thermoplastic strip between said head and said impression roller, a roller assembly on said framework spaced from said head and impression roller, conveyor means between said impression roller and said roller assembly, said conveyor means being constructed and arranged to move said strip from said impression roller toward said roller assembly, said roller assembly comprising first roller means connected to said drive means for synchronous rotation with said impression roller and second roller means connected to said drive means for variable rotation relative to said impression roller, said head having a plurality of heat-sealing elements on the periphery thereof, said elements being spaced from each other and each having electrical resistance heating means constructed and arranged to form a line of seal and severance on said strip, said lines of seal and severance defining opposite sides of a bag therebetween, said heating means being individually and selectively connectable to a source of electrical energy, and nip-forming means on each element, said nip-forming comprising raised unheated areas on said elements, said area being positioned adjacent the corresponding heating means forwardly of the heating means relative to the direction of rotation of said head.

2. The machine of claim 1 wherein said raised areas comprise radially extending unheated knobs on said elements, said knobs being positioned adjacent the corresponding heating means forwardly of the heating means relative to the direction of rotation of said head.

3. The machine of claim 1 wherein said raised areas comprise at least one spring finger corresponding to a mating groove on the impression roller.

4. The machine of claim 1 wherein said raised areas comprise at least one ring positioned on a masking roller in tangency to said impression roller, said masking roller being positioned forwardly of the heating means relative to the direction of rotation of said head and being driven in synchronism with said impression roller.

5. The machine of claim 1 wherein means are provided to vary the speed of rotation of said impression roller relative to said sealing head.

6. The machine of claim 1 wherein said first roller means of said roller assembly is adjustable toward and away from said impression roller.

7. A method of making bags having sealed connecting nips between said bags whereby when said bags are severed from each other the sealed ends of said bags are imperforate, which comprises passing a double-ply strip of thermoplastic material between a rotating heating means and a rotating impression roller while indenting said strip away from said sealing head without the application of heat just prior to application of said heating means to said strip to form sealed connecting nips between the resulting bags, and then breaking said nips.

8. The method of claim 7 wherein a plurality of heating means are fixed on a rotatable head and are individually and selectively applied to said strip during rotation of said head.

9. The method of claim 8 wherein the speed of rotation of said sealing head and said impression roller are selectively varied relative to each other.